United States Patent
Hayashi et al.

(10) Patent No.: US 11,442,415 B2
(45) Date of Patent: Sep. 13, 2022

(54) POWER CONVERSION SYSTEM AND POWER CONVERSION METHOD

(71) Applicant: Hitachi Industrial Equipment Systems Co., Ltd., Tokyo (JP)

(72) Inventors: Takaaki Hayashi, Tokyo (JP); Yusuke Arao, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 17/046,758

(22) PCT Filed: Dec. 14, 2018

(86) PCT No.: PCT/JP2018/046068
§ 371 (c)(1),
(2) Date: Oct. 9, 2020

(87) PCT Pub. No.: WO2019/207837
PCT Pub. Date: Oct. 31, 2019

(65) Prior Publication Data
US 2021/0096516 A1    Apr. 1, 2021

(30) Foreign Application Priority Data
Apr. 25, 2018    (JP) .............................. JP2018-083954

(51) Int. Cl.
*H02P 29/024* (2016.01)
*G05B 9/02* (2006.01)
*H02M 7/5395* (2006.01)

(52) U.S. Cl.
CPC ............ *G05B 9/02* (2013.01); *H02M 7/5395* (2013.01); *H02P 29/0241* (2016.02)

(58) Field of Classification Search
CPC .............. H02P 29/032; H02P 29/0241; H02M 7/5395; G05B 9/02
See application file for complete search history.

(56) References Cited

U.S. PATENT DOCUMENTS 5,489,250 A * 2/1996 Densmore .......... A63B 22/0257
482/54
5,757,161 A * 5/1998 Ikkai ..................... B60L 15/025
318/719

(Continued)

FOREIGN PATENT DOCUMENTS

| EP | 2 372 478 A2 | 10/2011 |
| EP | 3 203 627 A1 | 8/2017 |

(Continued)

OTHER PUBLICATIONS

International Search Report (PCT/ISA/210) issued in PCT Application No. PCT/JP2018/046068 dated Feb. 12, 2019 with English translation (five pages).

(Continued)

*Primary Examiner* — Rina I Duda
(74) *Attorney, Agent, or Firm* — Crowell & Moring LLP

(57) ABSTRACT

A power conversion device includes a function of improving safety of a system by making a dynamical setting for a safety function operation at a time of detecting an abnormality in a system operation or a diagnosis error in accordance with a condition of the system at a time of the abnormality. A power conversion system includes a power conversion device main body configured to drive a motor and a safety function unit configured to execute a safety function. The safety function unit outputs a safety function operation instruction signal when receiving a safety request signal, and (Continued)

the power conversion device main body controls the motor by the safety function operation instruction signal. The safety function unit monitors a state of the motor, and, in a case where the state of the motor exceeds a predetermined range, executes a threshold-value-excess post-process by a safety function operation selected in advance.

8 Claims, 14 Drawing Sheets

(56) References Cited

U.S. PATENT DOCUMENTS

| | | | |
|---|---|---|---|
| 7,896,135 B2* | 3/2011 | Kattainen | B66B 1/343 187/248 |
| 8,096,387 B2* | 1/2012 | Kattainen | B66B 1/30 187/248 |
| 2006/0022624 A1 | 2/2006 | Ushiyama et al. | |
| 2011/0241447 A1 | 10/2011 | Ando et al. | |
| 2014/0018958 A1* | 1/2014 | Ueno | G05B 19/406 700/255 |
| 2014/0070743 A1* | 3/2014 | Yoshida | H02P 29/024 318/400.22 |
| 2014/0330489 A1* | 11/2014 | Sakamoto | E02F 9/2091 701/50 |
| 2016/0261107 A1 | 9/2016 | Itten et al. | |
| 2016/0363924 A1 | 12/2016 | Tanaka | |
| 2017/0261960 A1 | 9/2017 | Ushiyama et al. | |
| 2018/0294762 A1 | 10/2018 | Matsumura et al. | |
| 2019/0226450 A1 | 7/2019 | Theopold et al. | |

FOREIGN PATENT DOCUMENTS

| | | |
|---|---|---|
| JP | 2006-11730 A | 1/2006 |
| JP | 2006-50682 A | 2/2006 |
| JP | 2011-229359 A | 11/2011 |
| JP | 2017-5913 A | 1/2017 |
| JP | 2017-535879 A | 11/2017 |
| JP | 2018-182876 A | 11/2018 |
| WO | WO 2016/051552 A1 | 4/2016 |

OTHER PUBLICATIONS

Japanese-language Written Opinion (PCT/ISA/237) issued in PCT Application No. PCT/JP2018/046068 dated Feb. 12, 2019 with English translation (six pages).

Hindi-language Office Action issued in Indian Application No. 202017048844 dated Apr. 23, 2021 with English translation (six (6) pages).

Japanese-language Office Action issued in Japanese Application No. 2018-083954 dated Dec. 21, 2021 with English translation ((5) five pages).

Extended European Search Report issued in European Application No. 18915971.8 dated Dec. 21, 2021 (ten (10) pages).

* cited by examiner

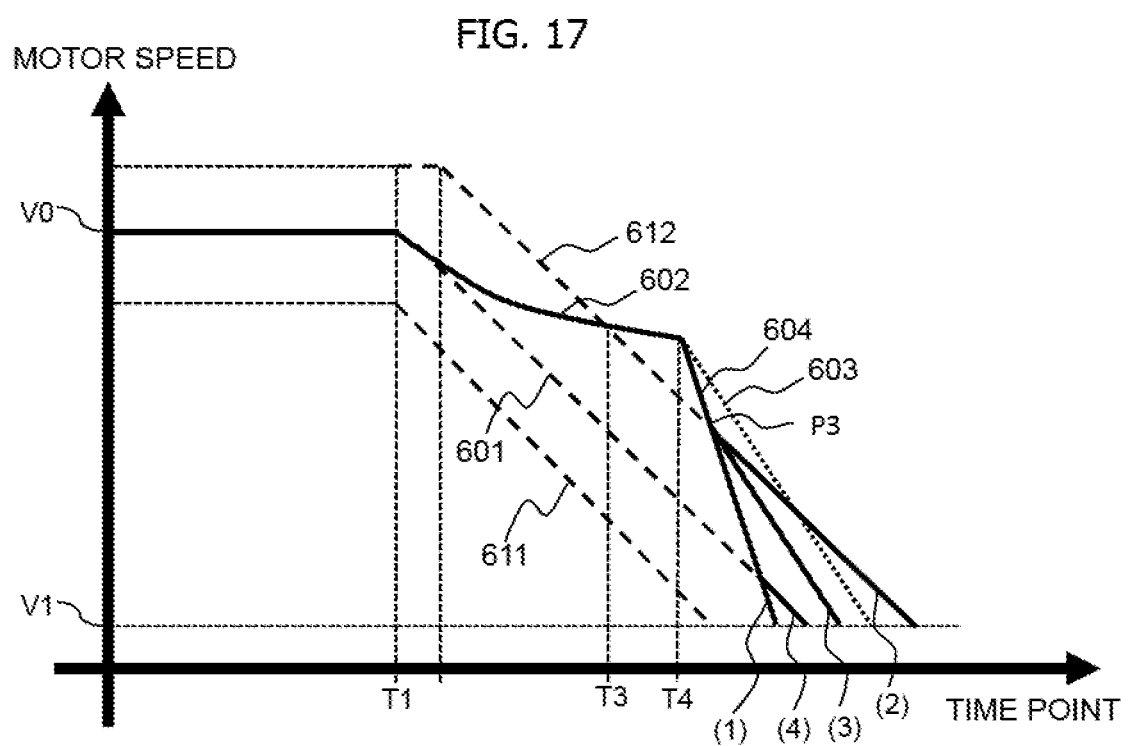

POWER CONVERSION SYSTEM AND POWER CONVERSION METHOD

TECHNICAL FIELD

The present invention relates to a power conversion system, particularly, to a safety function operation.

BACKGROUND ART

In the related art, in a power conversion device ready for functional safety, a safety function operation of operating a system to become safe when an abnormality in a system operation or a diagnosis error is detected is proposed (for example, Patent Document 1).

CITATION LIST

Patent Document

Patent Document 1: WO 2016/051552 A

SUMMARY OF THE INVENTION

Problems to be Solved by the Invention

In a control method disclosed in Patent Document 1, in a case where an abnormality occurs in a system operation such as a deceleration control or in a case where an occurrence of a diagnosis error is detected, torque applied to a motor is cut off by a safe torque off (STO) function as a safety function operation. Meanwhile, as a technical trend of the safety function operation, a technology of more safely controlling the system is becoming widespread in addition to cutting-off by an STO operation. In the present invention, a function of more improving safety of the system by making a dynamical setting for the safety function operation in accordance with a condition of the system at a time of the abnormality is provided.

Solutions to Problems

Considering the background and the object described above, according to an example of the present invention, a power conversion device includes a power conversion device main body configured to drive a motor and a safety function unit configured to execute a safety function. The safety function unit outputs a safety function operation instruction signal when receiving a safety request signal, and the power conversion device main body controls the motor by the safety function operation instruction signal. The safety function unit monitors a state of the motor, and, in a case where the state of the motor exceeds a predetermined range, executes a threshold-value-excess post-process by a safety function operation selected in advance.

Effects of the Invention

According to the present invention, it is possible to finely control driving of the motor in accordance with a condition of the system, in a dynamic situation, for example, after abnormality in a system operation or a diagnosis error occurs. Thus, the safety of the system is improved.

BRIEF DESCRIPTION OF THE DRAWINGS

FIG. 17 is a graph for describing a safety-region-returning post-process in the example.

MODE FOR CARRYING OUT THE INVENTION

Figure 1A:
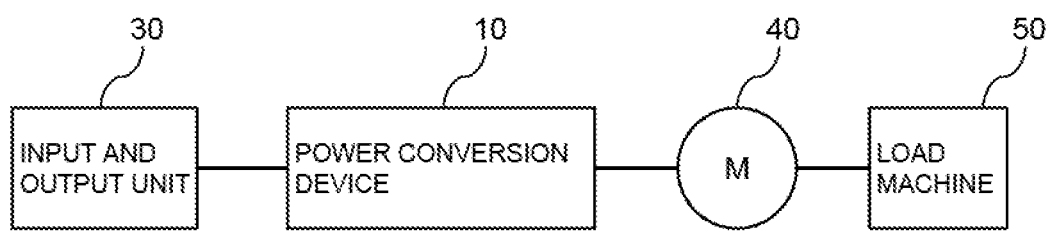
FIG. 1A is a system block diagram illustrating a functional configuration in a case where a power conversion device operates a safety function, according to an example.

Hereinafter, examples of the present invention will be described with reference to the drawings. Note that common components in the drawings are denoted by the same reference signs. In addition, the examples described below are not limited to examples described with reference to the drawings.

Examples

Figure 1B:
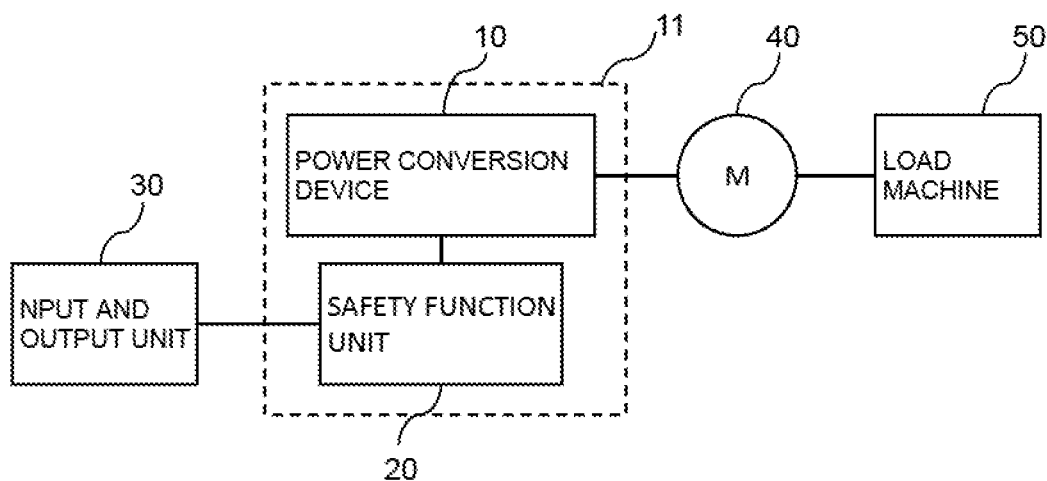
FIG. 1B is a system block diagram illustrating a functional configuration in a case where a safety function unit is connected to the power conversion device to operate the safety function, in the example.

FIGS. 1A and 1B are system block diagram illustrating a functional configuration in a case where a safety function is operated, according to an example. FIG. 1A illustrates the functional configuration in a case where a power conversion device operates the safety function. In FIG. 1A, a power conversion device 10, an input and output unit 30, a motor 40, and a load machine 50 are provided. The motor 40 is a device that converts electrical energy into mechanical energy, and is, for example, a three-phase AC motor.

The load machine 50 is a component of an industrial machine such as an elevator or a machine tool, and is connected to the motor 40 and driven.

The input and output unit 30 receives an input of a safety request signal such as an emergency stop signal for putting the load machine 50 into a safe state, and outputs the safety request signal. Examples of the input and output unit include an emergency stop switch that is pushed by a worker engaged in the load machine 50 to output the emergency stop signal, or a light curtain and a safety door lock that detects that a person approaches the load machine 50 or a prohibited door is opened, and outputs the emergency stop signal. In addition, a safety relay, a safety PLC, or the like which is used by being connected to a plurality of the above devices and which outputs the emergency stop signal when an emergency notification is received from the devices may be provided. The emergency stop signal is one of safety request signals for requesting execution of a safety function defined in the international standard IEC61800-5-2. Additionally, a configuration in which a safety function operation instruction signal output from a safety function unit 20 described later is output to an external brake (not illustrated), and thus the external brake operates may be made.

The power conversion device 10 controls driving of the motor 40. The detailed configuration of the motor will be described later. In a case where the power conversion device receives a safety request signal such as the emergency stop signal from the input and output unit 30, the power conversion device 10 controls the motor, for example, stops the motor 40.

FIG. 1B is a block diagram illustrating a functional configuration in a case where the safety function unit is connected to the power conversion device to operate the safety function. In FIG. 1B, the safety function unit 20 is connected to the power conversion device 10 to operate, and outputs a control signal to the power conversion device 10 to execute a safety function of not only urgently stopping the motor 40, but also decelerating and stopping the motor 40 or maintaining the speed of the motor to a constant speed. The detailed configuration of the safety function unit will be described later.

As described above, the power conversion device 10 is capable of singly controlling the motor 40 and executing the safety function and is capable of executing an enhanced safety function further if the safety function unit 20 is connected to the power conversion device. Note that a new power conversion device 11 may be obtained by a combination of the power conversion device 10 as a power conversion device main body and the safety function unit 20 connected to the power conversion device.

Figure 2:
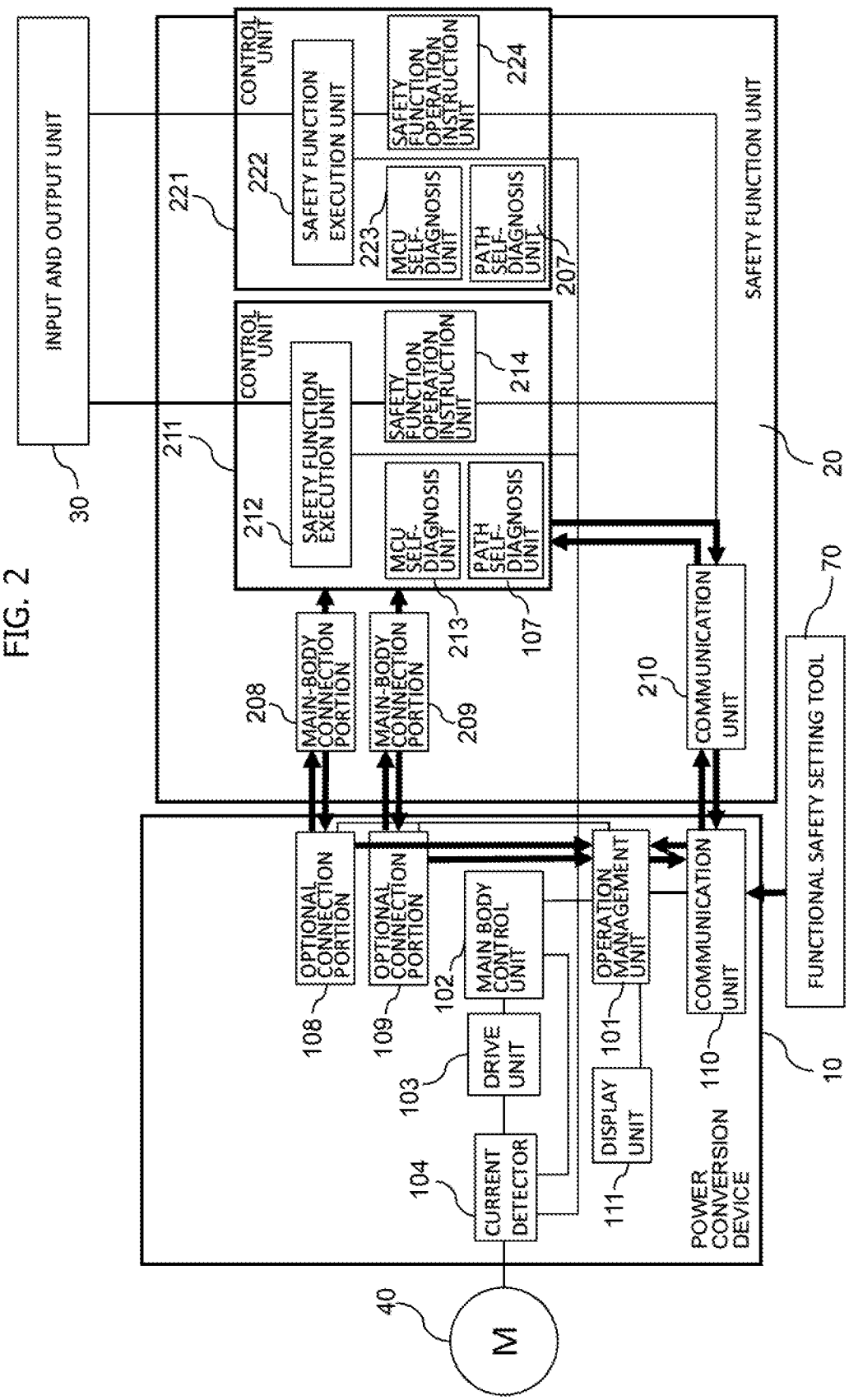
FIG. 2 is a diagram illustrating a configuration of the power conversion device and the safety function unit and a data flow when the power conversion device and the safety function unit are connected to each other, in the example.

FIG. 2 is a diagram illustrating an example of a configuration of a duplication with the power conversion device and the safety function unit and a data flow at a time of connection, in the example.

In FIG. 2, the power conversion device 10 includes an operation management unit 101, a main body control unit 102, a drive unit 103, a current detector 104, optional connection portions 108 and 109, a communication unit 110, and a display unit 111.

The operation management unit 101 outputs a speed instruction to the main body control unit 102 to perform driving control of the motor. For example, the operation management unit is configured by a central processing unit (CPU) and a program that operates on the CPU. In addition, the operation management unit outputs an instruction to notify the display unit 111 of the state of the power conversion device 10 or outputs an instruction of a communication to the communication unit 110 when intending to communicate with an external device.

The main body control unit 102 outputs a pulse width modulation (PWM) control signal to the drive unit 103. For example, the main body control unit is a program that operates on the CPU.

The drive unit 103 supplies electric power for giving torque to the motor 40.

The current detector 104 measures a current supplied from the drive unit 103 to the motor 40 and is configured by a Hall element, for example.

The optional connection portion 108 is a terminal for a connection with the safety function unit 20. The optional connection portion outputs a connection completion signal when the optional connection portion has been connected to the safety function unit 20, and outputs a disconnection signal when the optional connection portion is separated from the safety function unit 20. For example, specifically, the output of the connection completion signal means turning into a state where a voltage of the terminal of the optional connection portion 108 becomes high (for example, a state where the voltage is 24 V or the like). The output of the disconnection signal means turning into a state where the voltage of the terminal becomes low (for example, a state where the voltage is 0 V or the like). In a state where the power is put into the power conversion device 10, the operation management unit 101 is capable of determining whether or not the optional connection portion is connected to the safety function unit 20, by acquiring the terminal voltage of the optional connection portion 108. The optional connection portion 109 is similar to the optional connection portion 108.

In FIG. 2, the safety function unit 20 includes a communication unit 210, control units 211 and 221, safety function execution units 212 and 222, MCU self-diagnosis units 213 and 223, path self-diagnosis units 107 and 207, safety function operation instruction units 214 and 224, and main-body connection portions 208 and 209. Note that, in the example, the control unit has a duplicated configuration in which two control units 211 and 221 are provided, but the purpose is similar even though the control unit has a single configuration.

Additionally, a functional safety setting tool 70 is used when the safety function operation to be executed when the safety request signal is received is selected and set in advance or when an operation parameter is set. Details will be later when descriptions will be made with reference to FIG. 14 and the like.

The communication unit 210 is used when the safety function unit 20 transmits and receives data to and from another information processing apparatus. The communication unit 210 is also used in a case where the safety function unit 20 transmits and receives data to and from the power conversion device 10. In addition, the communication unit executes a communication process and the like when the safety function unit 20 intends to access the Internet, another information processing apparatus, or the like. In addition, the example is not limited to a case where only one communication unit 210 is used. For example, a plurality of communication units may be provided in order to enable using of a plurality of communication methods such as Bluetooth (registered trademark), a wireless LAN, the code division multiple access (CDMA), and Long Term Evolution (LTE: registered trademark). In addition, duplication of the communication unit 210 and the communication unit 110 may be made. With the duplication, even though one of the communication units has a problem, the communication is performed with the other communication unit. Thus, the safety of the device is improved.

The control unit 211 is configured, for example, by a CPU and executes processes such as management of data, calculation, transmission, and reception. The control unit 221 is similar to the control unit 211.

The safety function execution unit 212 monitors the speed of the motor 40, or receives a safety request signal from the input and output unit 30 and outputs a safety function operation execution signal of STO or the like. The detailed configuration will be described later with reference to FIG. 9. The safety function execution unit 222 is similar to the safety function execution unit 212.

The MCU self-diagnosis unit 213 diagnoses whether or not the control unit 211 operates normally. For example, the MCU self-diagnosis unit regularly checks whether or not a program executed on the control unit 211 does not have hung up, using a watchdog timer. The MCU self-diagnosis unit 223 is similar to the MCU self-diagnosis unit 213.

When the safety function operation instruction unit receives a safety request signal such as the emergency stop signal from the safety function execution unit 212, the safety function operation instruction unit 214 outputs a safety function operation instruction signal to the power conversion device 10. The safety function operation instruction unit 224 is similar to the safety function operation instruction unit 214.

The main-body connection portion 208 is a terminal for a connection with the power conversion device 10. The main-body connection portion 209 is similar to the main-body connection portion 208.

The path self-diagnosis unit 107 checks whether or not a signal is transmitted from the safety function execution unit 212 to the drive unit 103. The path self-diagnosis unit transmits a test pulse at predetermined time intervals and detects whether or not the signal has arrived at the drive unit 103. In a case where the signal has not arrived, the path self-diagnosis unit notifies the operation management unit 101 of an error occurrence. Note that the MCU self-diagnosis unit 213 and the path self-diagnosis unit 107 may be configured as one module. The path self-diagnosis unit 207 is similar to the path self-diagnosis unit 107.

FIG. 2 illustrates a signal flow when the power conversion device 10 and the safety function unit 20 are connected to each other, with arrows. The data flow in a connection process will be described with reference to FIG. 2.

In FIG. 2, firstly, when the optional connection portion 108 of the power conversion device 10 and the main-body connection portion 208 of the safety function unit 20 are connected to each other, each of the optional connection portion 108 and the main-body connection portion 208 outputs a connection completion signal. In addition, each of the optional connection portion 109 and the main-body connection portion 209 similarly outputs the connection completion signal. The connection completion signals output from the optional connection portions 108 and 109 are transmitted to the operation management unit 101. Further, the connection completion signals are transmitted to the control unit 211 through the communication unit 110 and the communication unit 210. In addition, the connection completion signals output from the main-body connection portions 208 and 209 are transmitted to the control unit 211. Further, the connection completion signals are transmitted to the operation management unit 101 through the communication unit 210 and the communication unit 110. In this manner, the connection completion signal output from the power conversion device 10 and the connection completion signal output from the safety function unit 20 are mutually exchanged with each other, and the four connection completion signals in total are output.

The connection completion signals are received by the operation management unit 101 and the control unit 211. In a case where the operation management unit and the control unit receive all the connection completion signals, the units determine that the connection has been normally completed and display a message indicating that the safety function unit is normally connected, on the display unit 111. In a case where all the connection completion signals are not received, the units determine that a connection error occurs, and performs a display for indicating the occurrence of the connection error.

Figure 3A:
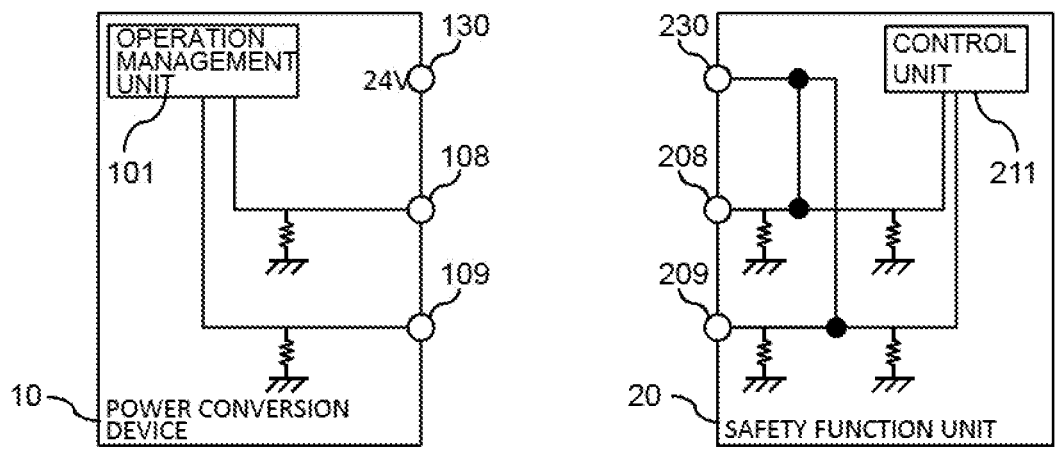
FIG. 3A is a circuit diagram illustrating a state where the power conversion device and the safety function unit are not connected to each other, in the example.

Next, details of the optional connection portion and the main-body connection portion will be described with reference to FIGS. 3A to 3C. FIG. 3A illustrates a circuit diagram in a state where the power conversion device 10 and the safety function unit 20 are not connected to each other. The optional connection portions 108 and 109 are not connected to the safety function unit 20. Even though the power of the power conversion device 10 is put in this state, the voltage of the terminals of the optional connection portions 108 and 109 is low (for example, 0 V). That is, disconnection signals are output from the optional connection portions 108 and 109, and the operation management unit 101 receives the disconnection signals.

Figure 3B:
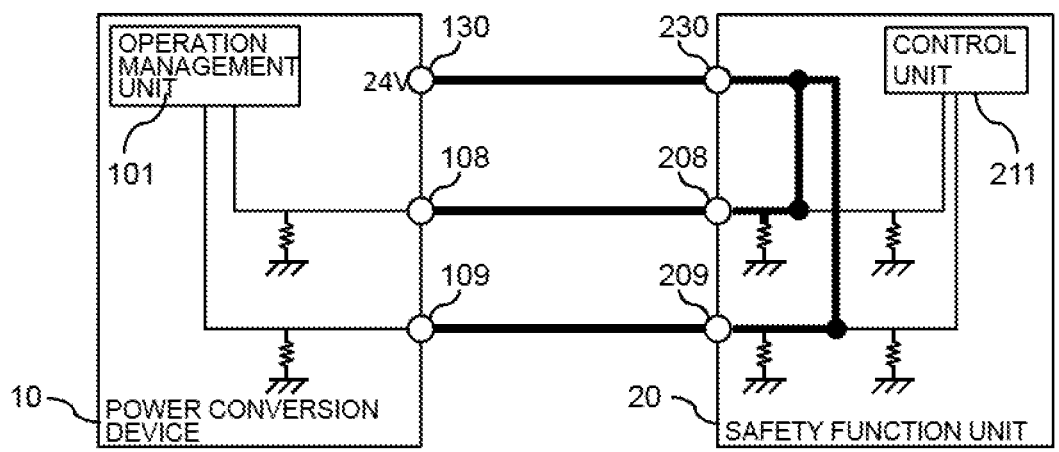
FIG. 3B is a circuit diagram illustrating a state where the power conversion device and the safety function unit are connected to each other, in the example.

FIG. 3B illustrates a circuit diagram in a state where the power conversion device 10 and the safety function unit 20 are connected to each other. A terminal 130 is used for supplying a voltage from the power conversion device 10 to the safety function unit 20. The terminal 130 is connected to a terminal 230 of the safety function unit 20. In the safety function unit 20, the terminal 230 is electrically connected to the main-body connection portions 208 and 209. Therefore, when the power of the power conversion device 10 is put in a state where the optional connection portions 108 and 109 are connected to the main-body connection portions 208 and 209, the voltages of the optional connection portions 108 and 109 and the main-body connection portions 208 and 209 become high (for example, 24 V). That is, the connection completion signal is output.

Note that the terminal 130, the terminal of the optional connection portion 108, and the terminal of the optional connection portion 109 may be collectively configured as one connector.

Figure 3C:
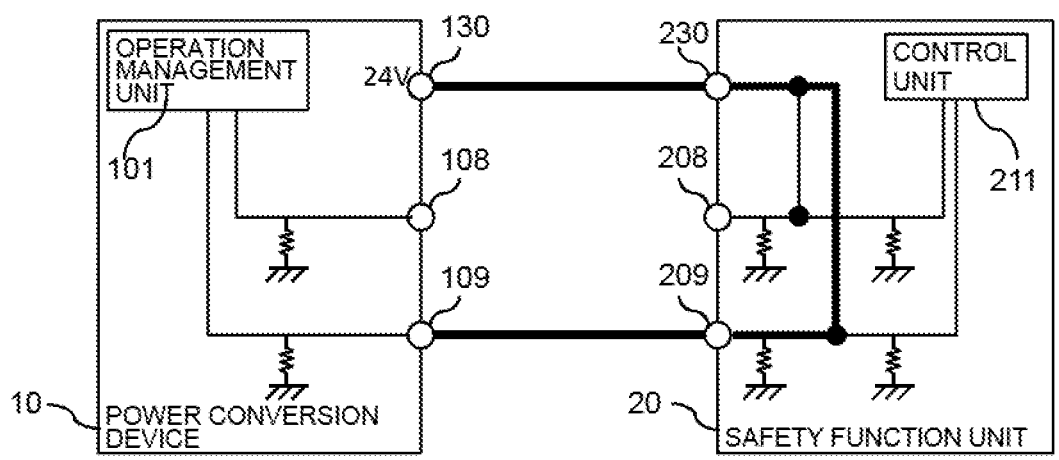
FIG. 3C is a circuit diagram illustrating a state where an optional connection portion and a main-body connection portion are not connected to each other in a state where the power conversion device and the safety function unit are connected to each other, in the example.

FIG. 3C illustrates a circuit diagram illustrating a state where the optional connection portion 108 and the main-body connection portion 208 are not connected to each other by connection failure or the like even though the power conversion device 10 and the safety function unit 20 are connected to each other. In this state, when the power of the power conversion device 10 is put, the voltages of the optional connection portion 109 and the main-body connection portion 209 become high (for example, 24 V), but the voltages of the optional connection portion 108 and the main-body connection portion 208 are low (for example, 0 V). That is, the connection completion signals are output from the optional connection portion 109 and the main-body connection portion 209, and the disconnection signals are output from the optional connection portion 108 and the main-body connection portion 208.

As described above, since the connection state is grasped by acquiring the voltages of the optional connection portion and the main-body connection portion, it is possible to immediately grasp the change in connection state. Thus, it is possible to secure safety, for example, by immediately stopping the motor in a case where it is determined that a problem occurs.

Note that the power conversion device 10 may further include a connection switch button. The connection switch button indicates whether or not the safety function unit 20 is being connected. For example, in a case where the safety function unit 20 is connected, a user pushes the connection switch button to explicitly notify the power conversion device 10 that the safety function unit is being connected. Thus, the power conversion device 10 can reliably grasp the connection state and ensure the safety.

In addition, the power conversion device 10 may store the connection state in the operation management unit 101 or the like. Thus, when the operation management unit checks the connection state, the operation management unit 101 can check the connection state with connection information stored in the operation management unit 101 in addition to the connection completion signal or the disconnection signal output from the optional connection portions 108 and 109. Accordingly, it is possible to ensure the safety more.

Figure 4:
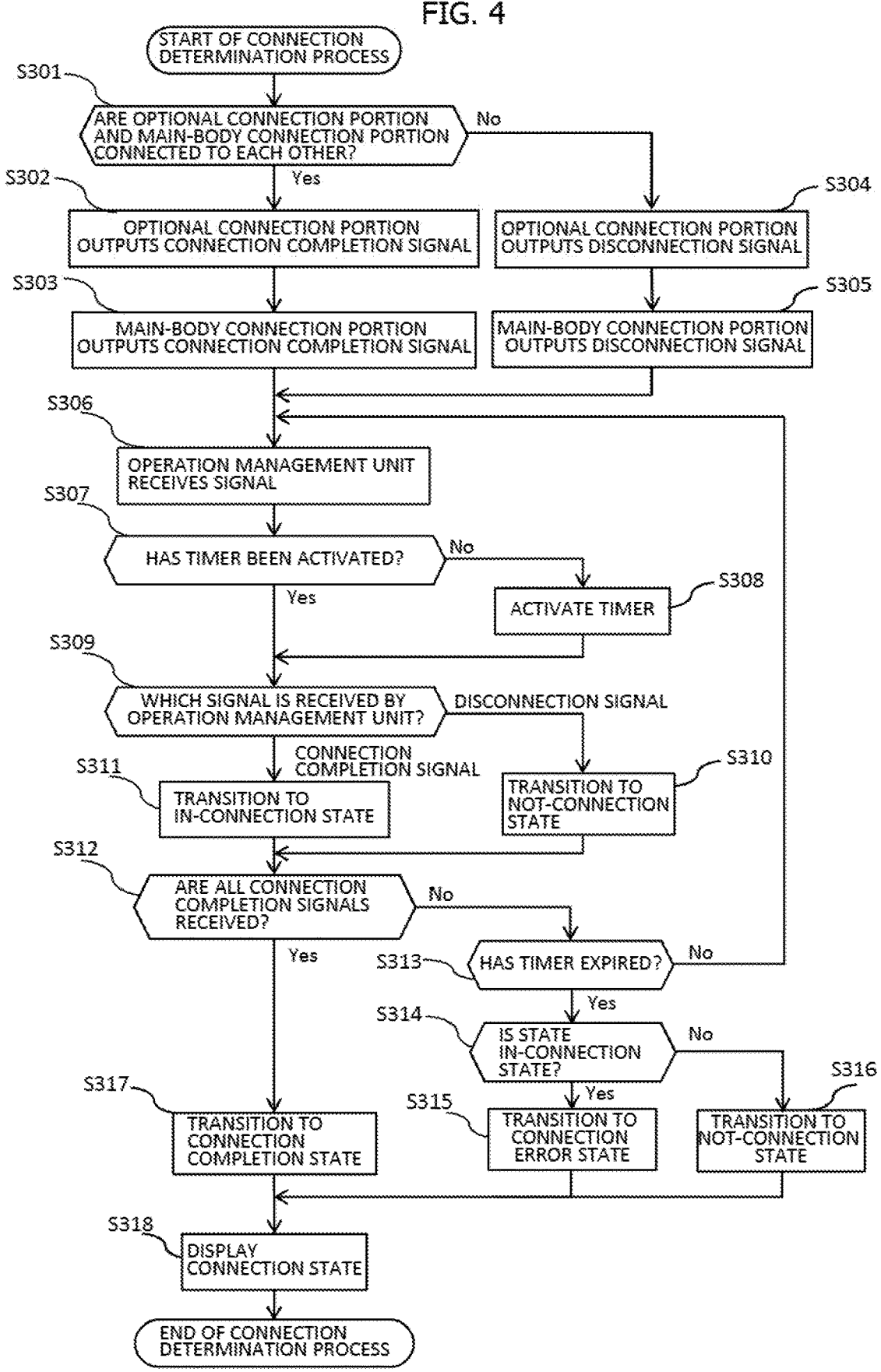
FIG. 4 is a flowchart describing a connection process between the power conversion device and the safety function unit, in the example.

Details of a connection determination process flow between the power conversion device 10 and the safety function unit 20 will be described with reference to FIG. 4. In FIG. 4, firstly, in a case where the optional connection portion and the main-body connection portion are connected to each other, the optional connection portions 108 and 109 output a connection completion signal (Step S302), and the main-body connection portions 208 and 209 also output the connection completion signal (Step S303). Here, if the optional connection portion or the main-body connection portion operates normally, four connection completion signals are output. In a case where any one of the connection portions has a problem, the four connection completion signals are not output. In addition, in a case where the optional connection portion and the main-body connection portion are not connected to each other, the optional connection portions 108 and 109 output a disconnection signal (Step S304), and the main-body connection portions 208 and 209 also output the disconnection signal (Step S305).

Then, the operation management unit 101 receives the connection completion signal or the disconnection signal output from the optional connection portion and the main-body connection portion (Step S306).

Then, whether or not a timer has been activated is checked (Step S307). In a case where the timer is not activated, the timer is activated (Step S308). The timer is used for measuring the time, when a case where it is not possible for the operation management unit to receive all the connection completion signal within a predetermined time is determined to the occurrence of a connection error.

Then, which signal of the connection completion signal and the disconnection signal is received by the operation management unit 101 is checked (Step S309). In a case where the connection completion signal is received (Step S309: connection completion signal), the state transitions to an in-connection state (Step S311). Here, the in-connection state is one of states to be held by the operation management unit 101 and is a state of waiting for an output of the connection completion signal. For example, the state is held as a variable (for example, state) defined in the executed program. A case where the value of the variable state is 1 indicates the in-connection state. In a case where the disconnection signal is received (Step S309: disconnection signal), the state transitions to a not-connection state (Step S310). The not-connection state refers to a state indicating that the safety function unit 20 is not connected to the power conversion device 10. Differing from a connection error state, the power conversion device 10 can start the operation of the motor even in the not-connection state.

Then, whether or not all the connection completion signals are received is checked (Step S312). In a case where all the connection completion signals are received, it is determined that the connection is normally performed, and the state transitions to a connection completion state (Step S317). In a case where it is not possible to receive all the connection completion signals, whether or not the timer has expired is checked (Step S313). When the timer does not have expired, the process returns to Step S306 and the process of receiving the signal is executed.

In a case where it is not possible to receive all the connection completion signals, and the timer has expired, whether or not the state is the in-connection state is checked (Step S314). In a case where the state is the in-connection state, it is determined that the connection error occurs, and the state transitions to the connection error state (Step S315). In addition, in a case where the state is not the in-connection state, the not-connection state is maintained (Step S316).

Then, the content according to the connection state is displayed on the display unit 111 (Step S318). For example, if the state is the connection completion state, a message indicating that "connection has been normally completed" is displayed. If the state is the connection error state, a message indicating that "the connection error occurs" is displayed.

In addition, the connection state may be displayed with an LED or the like. An LED that is lit when the connection is normally performed and an LED that is lit when the connection error occurs may be provided to be distinguished from each other. A user may be notified of the connection state by changing the color of light emitted by one LED in accordance with the connection state. Thus, the user can check the connection state at a glance by looking at the LED, and thus the safety is more improved.

Note that, although not illustrated in FIG. 4, the connection completion signal is also received by the control unit 211. The control unit 211 executes the process similar to that executed by the operation management unit 101, and thereby it is possible to grasp whether the connection has been normally performed or an error has occurred.

In addition, the power conversion device 10 and the safety function unit 20 are connected to each other in a state where the power of both the power conversion device and the safety function unit is OFF. Thus, the operation of the motor is started in a manner that the power turns ON after the connection has been completed, and then the user pushes an operation start button. At this time, if the connection has been normally completed, the operation of the motor may be started. If the connection error occurs, the motor is desired not to be operated.

Figure 5:
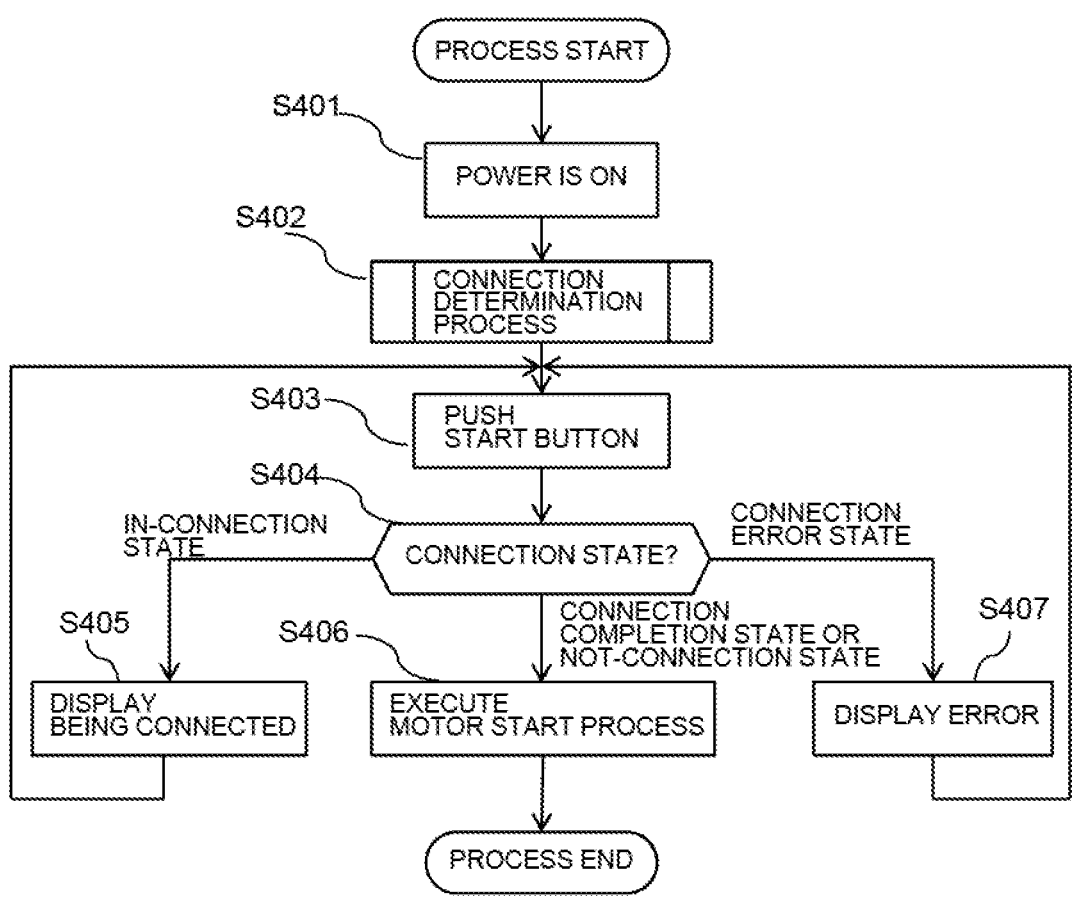
FIG. 5 is a flowchart describing a flow from when power is put into the power conversion device and the safety function unit until an operation of a motor is started, in the example.

Next, a flow of a process from when power is put into the power conversion device 10 and the safety function unit 20 until the operation of a motor is started will be described with reference to FIG. 5. In FIG. 5, firstly, when the power of the power conversion device 10 and the safety function unit 20 turns ON by the user (Step S401), a connection determination process described in FIG. 4 is executed (Step S402). Thus, the connection state transitions any one of the connection completion state, the connection error state, the in-connection state, and the not-connection state. Then, a start button is pushed by the user (Step S403). Then, the operation management unit 101 checks the connection state (Step S404). If the connection state is the connection completion state or the not-connection state, an operation start process of the motor is executed (Step S406). In addition, if the connection state is the in-connection state, a message of being connected is displayed on the display unit 111 (Step S405), and then the state returns to a state of waiting for pushing the start button again. In addition, if the connection state is the connection error state, a message indicating that the connection error occurs is displayed on the display unit 111 (Step S407), and then the state returns to a state of waiting for pushing the start button again.

In addition, when the motor is operated in a state where the safety function unit 20 is connected, in a case where the connection is disconnected for any reason, it is desirable to immediately stop the operation of the motor. On the contrary, when the safety function unit 20 is not connected, and the power conversion device 10 singly operates the motor, in a case where the safety function unit 20 is connected, this connection is determined to be an unintended connection, and it is desirable to immediately stop the operation of the motor.

Figure 6:
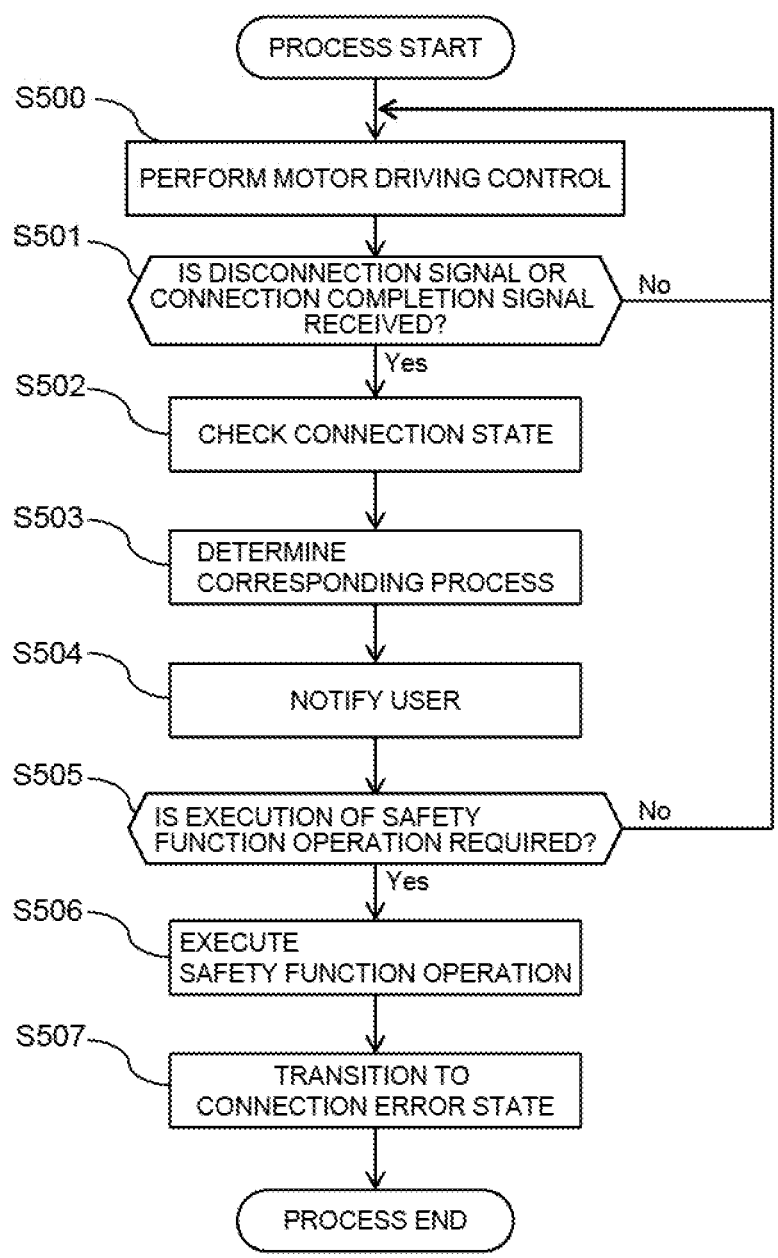
FIG. 6 is a flowchart of a case where the safety function unit is connected or disconnected to the power conversion device while the power conversion device operates the motor, in the example.

A process flow of the power conversion device 10 in a case where disconnection or connection is performed during the operation of the motor will be described with reference to FIG. 6. In FIG. 6, firstly, the operation management unit 101 outputs a speed instruction to the main body control unit 102 to perform driving control of the motor (Step S500).

Then, it is checked whether or not the disconnection signal indicating that the connection is disconnected or the connection completion signal indicating being connected is output from the optional connection portions 108 and 109 (Step S501). In a case where the signal is not output, the driving control of the motor is performed again (Step S500). In a case where the signal is output, the connection state is acquired and then checked (Step S502). Then, the process content to be executed is determined by a combination of the type of signal and the connection state (Step S503).

For example, when the disconnection signal is output in the connection completion state, this is determined to be an erroneous operation, for example, in which the safety function unit 20 is detached or connection failure occurs, and the motor needs to turn into a safe state. For example, in a case where setting is performed such that the operation management unit executes STO of an instruction for the main body control unit to stop the motor, a message indicating that the motor is safely stopped is displayed, and STO is executed.

In addition, in a case where the connection completion signal is output in the not-connection state, it is determined that the safety function unit 20 is attached, and a display for notifying the user that the operation of the motor is not influenced even though the safety function unit 20 is attached during the operation, but the safety function or the degree of safety is not improved is performed. In this case, the safety function operation such as STO may not be executed.

In addition, in a case where the state is the connection completion state, but the connection completion signal is output, or in a case where the state is the not-connection state, but the disconnection signal is output, this is a combination of which the occurrence is not possible if the device operates normally. Thus, it is determined that there is a possibility of the optional connection portions 108 and 109 having a problem. A display for notifying the user of the possibility of the problem occurring is performed, and STO or the like is executed.

As described above, the content displayed on the display unit 111, whether or not the safety function operation is executed, and the like are determined by the combination of the connection state and the type of signal output by the optional connection portions 108 and 109.

Then, if there is a content of which the user is required to be notified, the content is displayed on the display unit 111 (Step S504).

Then, if it is required to execute the safety function operation, the safety function operation is executed (Step S506), and the state transitions to the connection error state (Step S507). If it is not required to execute the safety function operation, the driving control of the motor is performed again (Step S500).

Next, an operation from when the emergency stop signal is output from the input and output unit until an STO signal is input to the drive unit 103, in a case where it is set that the emergency stop signal is received as the safety request signal and STO is executed as the safety function operation will be described as an example.

Figure 7:
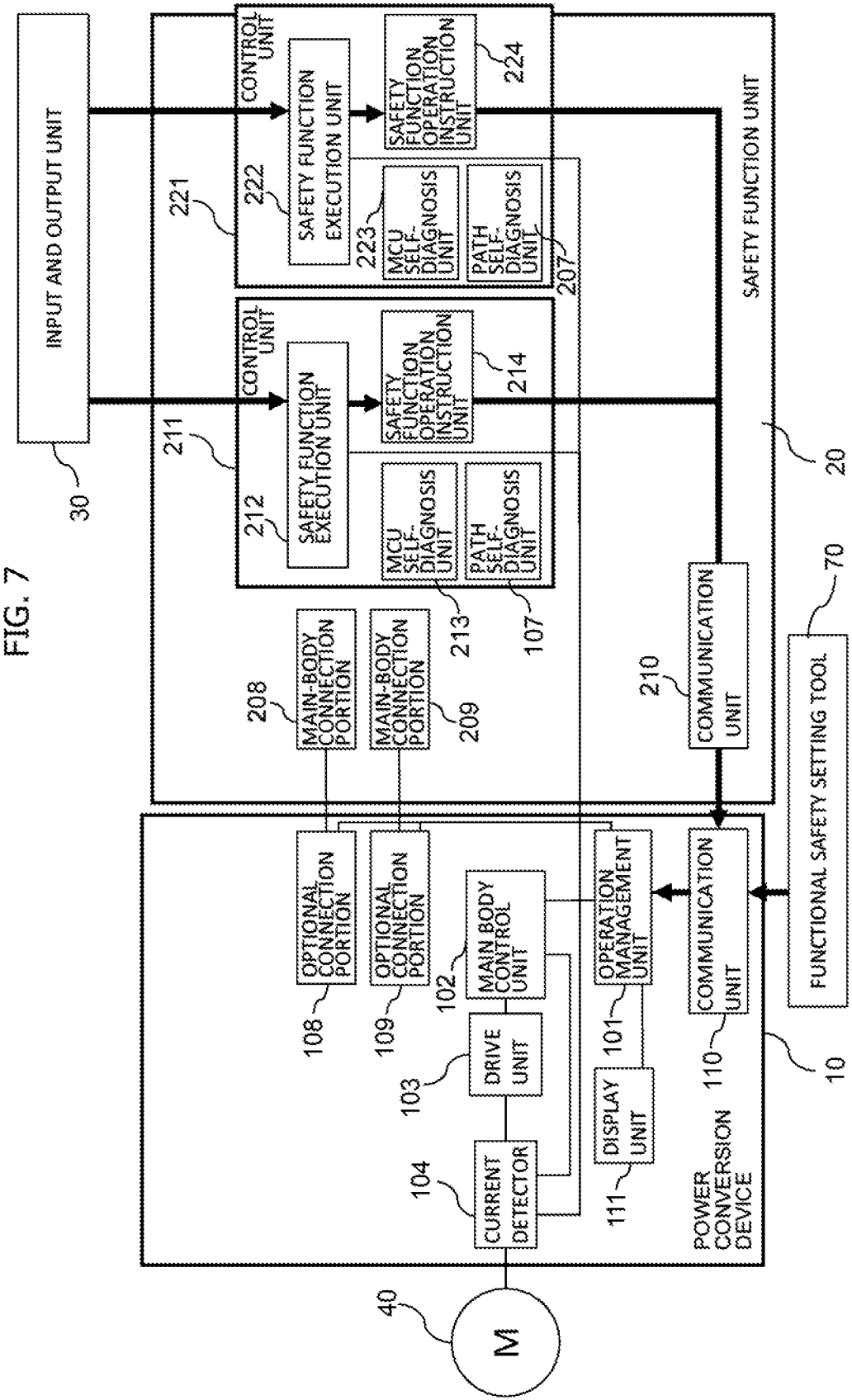
FIG. 7 is a diagram illustrating a configuration of the power conversion device and the safety function unit and a data flow when a safety request signal is received, in the example.

Firstly, an outline of a process flow when the emergency stop signal is output from the input and output unit and then the power conversion device is notified of the emergency stop signal will be described with reference to FIG. 7. In FIG. 7, firstly, if the emergency stop signal is output from the input and output unit 30, the emergency stop signal is input to the safety function execution units 212 and 222. An operation parameter described later is added to the emergency stop signal, and then is output to the safety function operation instruction units 214 and 224. Then, the above signal is transmitted to the operation management unit 101 through the communication units 210 and 110.

Figure 8:
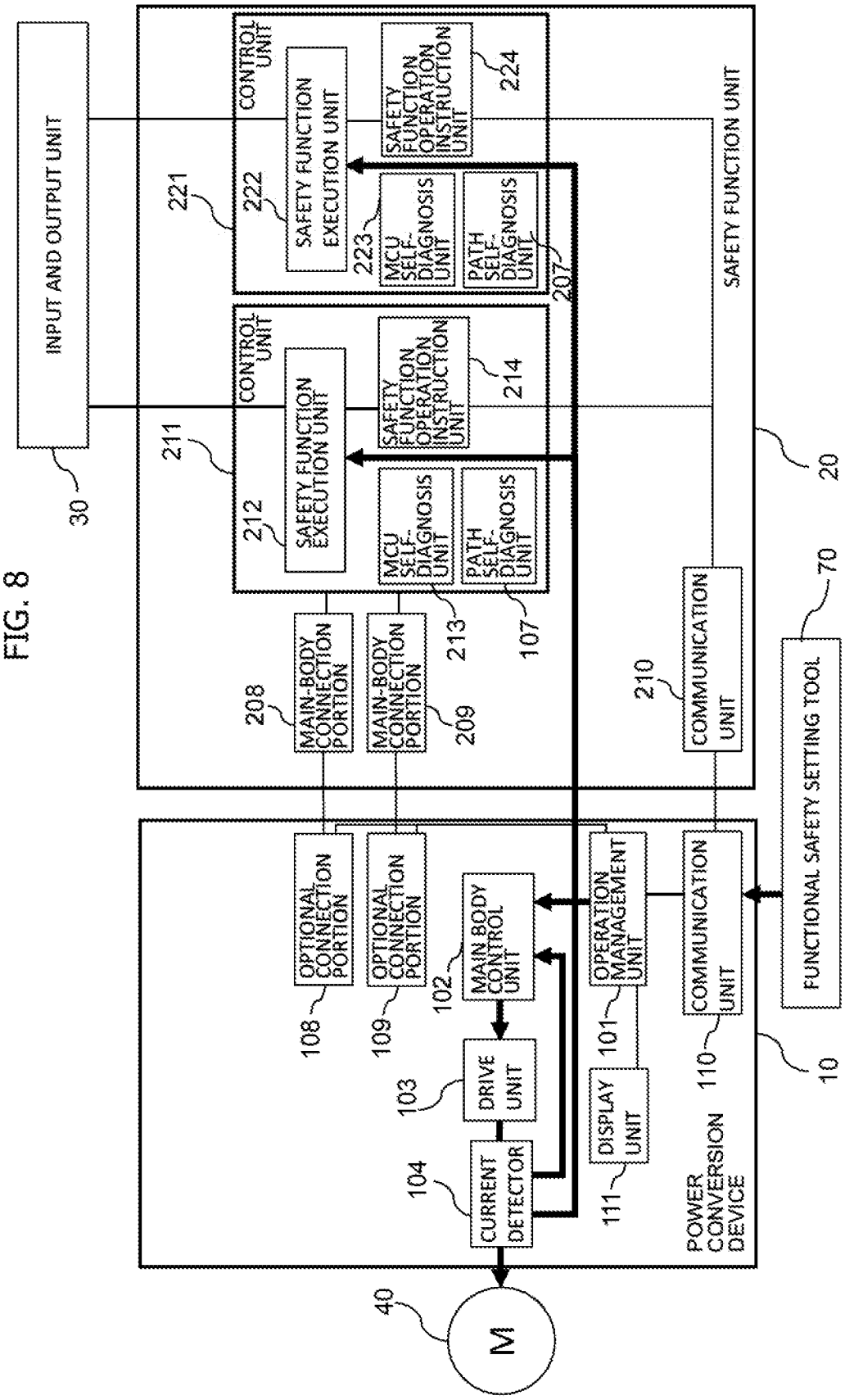
FIG. 8 is a diagram illustrating a configuration of the power conversion device and the safety function unit and a data flow when the motor decelerates, in the example.

Next, a flow of a process in which the safety function execution unit monitors the speed of the motor 40 when the motor 40 is decelerated will be described with reference to FIG. 8. In FIG. 8, if the operation management unit 101 receives a deceleration instruction, the operation management unit 101 outputs the deceleration instruction to the main body control unit 102 along with a parameter such as deceleration. The main body control unit 102 receives the output of the operation management unit, and outputs a PWM control signal to the drive unit 103 to decelerate the motor 40.

Then, the main body control unit 102 acquires a current value for estimating a motor speed (output frequency) output from the current detector 104. Further, the safety function execution units 212 and 222 also acquire the current value from the current detector 104. The safety function execution units 212 and 222 start monitoring of the speed of the motor 40 with the acquired current value. Then, if the speed of the motor 40 exceeds a predetermined threshold value for any reason, the safety function execution units 212 and 222 output the safety function operation instruction signal of STO or the like to the drive unit 103 through the communication units 210 and 110.

A safety function operation instruction signal is input to the drive unit 103 through the operation management unit 101 and the main body control unit 102. Then, the drive unit 103 turns off the torque generated in the motor 40.

In this manner, it is possible to decelerate the speed of the motor 40 and then stop the motor, when the emergency stop signal is output from the input and output unit, and to expand the safety function. Note that the manner of executing the safety function operation when the speed of the motor 40 exceeds the predetermined threshold value may be set by receiving the selection of the user with the functional safety setting tool 70 or the like in advance.

Figure 9:
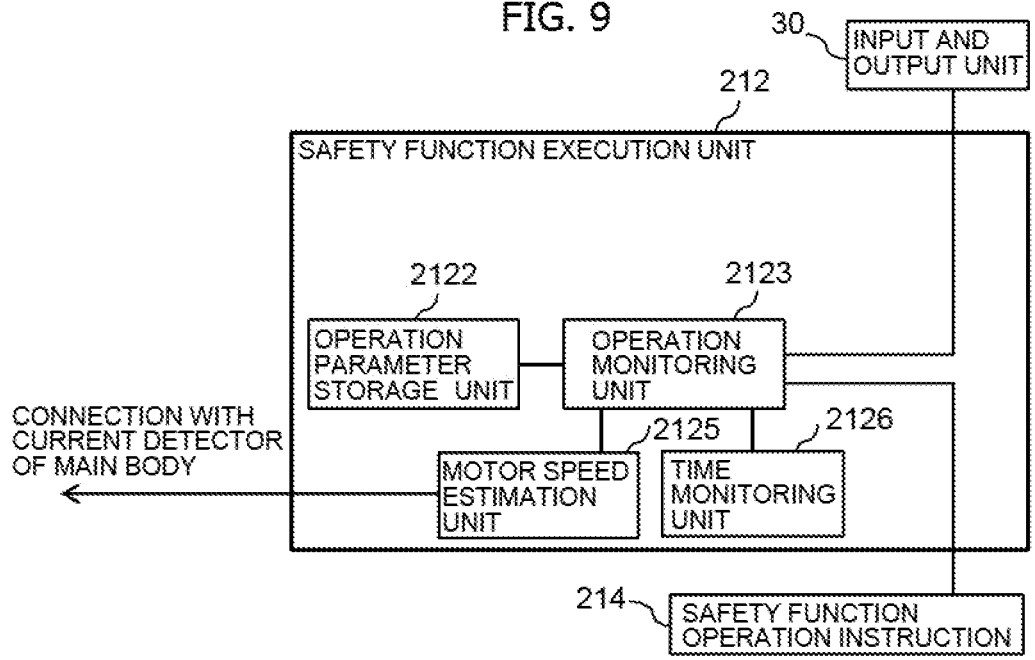
FIG. 9 is a diagram illustrating a configuration of a safety function execution unit in the example.

Here, the detailed configuration of the safety function execution unit 212 will be described with reference to FIG. 9. The safety function execution unit 222 has a similar configuration. In FIG. 9, the safety function execution unit 212 includes an operation parameter storage unit 2122, an operation monitoring unit 2123, a motor speed estimation unit 2125, and a time monitoring unit 2126.

The operation parameter storage unit 2122 stores operation parameters such as deceleration and the threshold value of the speed. For example, the operation parameter storage unit is configured by a RAM.

The motor speed estimation unit 2125 estimates the speed of the motor 40 based on the current value or the like output by the current detector 104. The motor speed estimation unit calculates the torque to be generated in the motor 40 from the magnitude or the frequency of a current fed to the motor 40 and converts the torque into a rotational speed of the motor 40. Note that an encoder that is added to the motor and outputs the number of rotations of the motor may be used. Thus, the speed of the motor is grasped more accurately, and the safety function is improved.

The time monitoring unit 2126 measures the elapsed time after receiving the safety request signal such as the emergency stop signal. The time monitoring unit outputs the elapsed time to the operation monitoring unit 2123 at predetermined time intervals.

The operation monitoring unit 2123 acquires the speed of the motor 40 and the elapsed time and monitors whether or not the acquire value reaches a predetermined threshold value. In a case where the value reaches the predetermined threshold value, the operation monitoring unit outputs the set safety function operation instruction signal of STO or the like.

Figure 10:
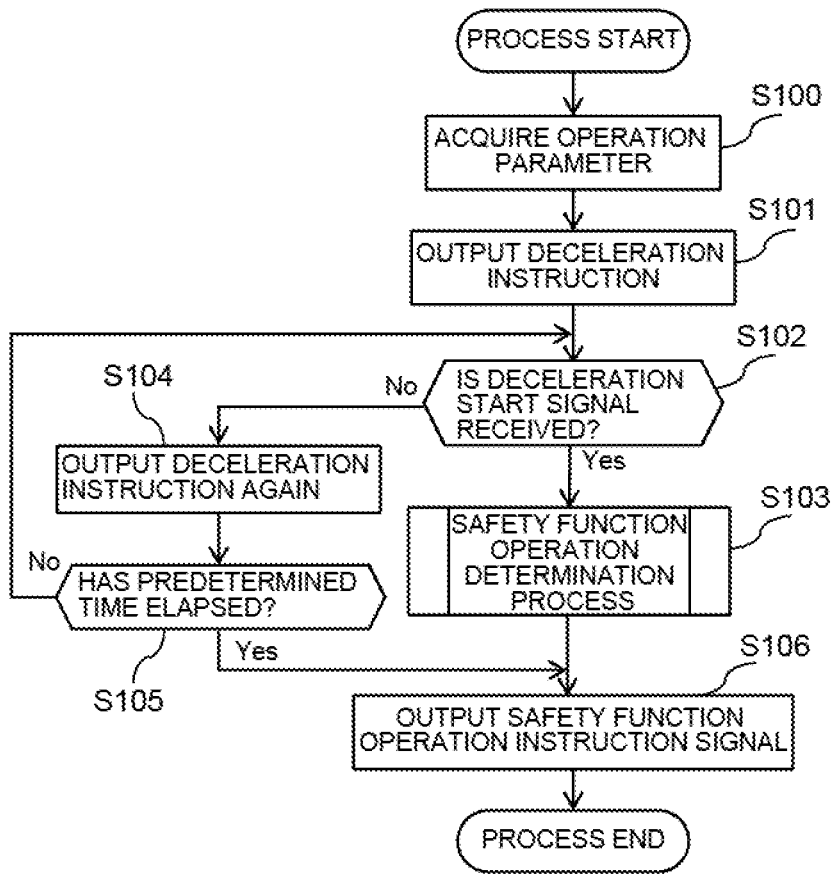
FIG. 10 is a flowchart of a process of an operation monitoring unit in the example.

A process flow of the operation monitoring unit 2123 in a case where the emergency stop signal is received as the safety request signal will be described with reference to FIG. 10. In FIG. 10, firstly, if the emergency stop signal is output from the input and output unit, and the operation monitoring unit 2123 in the safety function execution unit 212 receives the emergency stop signal, the operation monitoring unit acquires the operation parameter from the operation parameter storage unit 2122 (Step S100). A method of setting the operation parameter will be described later with the description of FIG. 14. Then, the operation monitoring unit 2123 outputs the acquired operation parameter to the safety function operation instruction unit 214, and the safety function operation instruction unit 214 outputs a deceleration instruction (Step S101). Then, the safety function operation instruction unit 214 determines whether or not to receive a deceleration start signal from the operation management unit 101 (Step S102). In a case where the safety function operation instruction unit does not receive the deceleration start signal, the safety function operation instruction unit outputs the deceleration instruction signal again (Step S104). Then, in a case where a predetermined time has not elapsed after the emergency stop signal is received, the process returns to Step S102 again. In a case where the predetermined time has elapsed, the safety function operation instruction unit determines that a certain error has occurred in the power conversion device 10, and outputs the safety function operation instruction signal of STO or the like (Step S106).

In a case where reception of the deceleration start signal is possible after the deceleration instruction is output, the safety function operation instruction unit executes the safety function operation determination process (Step S103). Then, if the safety function operation determination process is ended, the operation monitoring unit 2123 outputs the safety function operation instruction signal of STO or the like (Step S106).

Figure 11:
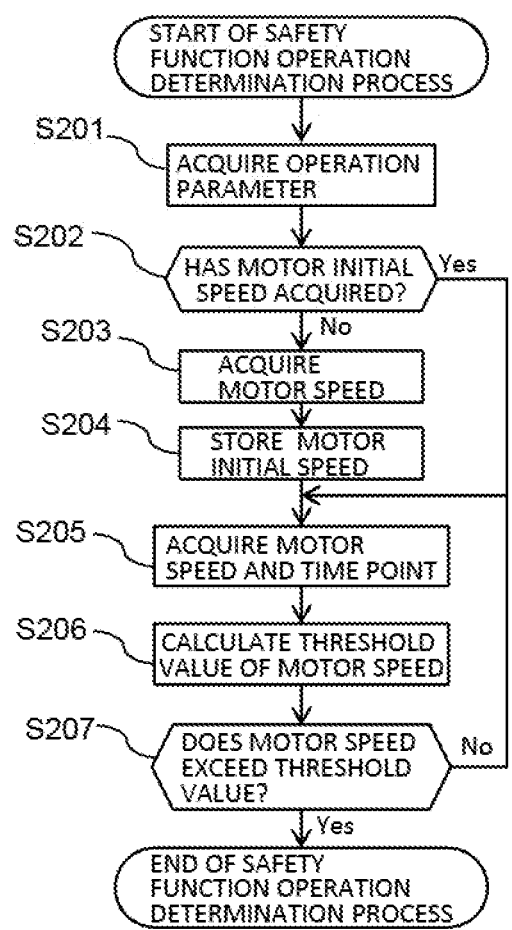
FIG. 11 is a flowchart of a safety function operation determination process in the example.

Here, the detailed flow of the safety function operation determination process will be described with reference to FIG. 11. In FIG. 11, in the safety function operation determination process, firstly, the operation monitoring unit 2123 acquires the operation parameter from the operation parameter storage unit 2122 (Step S201). Here, the operation parameter refers to deceleration, a speed as a threshold value for outputting the safety function operation instruction signal (STO or the like), or the like. The details will be described later with reference to FIG. 13. Then, the operation monitoring unit checks whether or not the initial speed of the motor has been acquired (Step S202). In a case where the initial speed has not been acquired, the operation monitoring unit acquires the speed of the motor (Step S203), and stores the acquire speed in the operation parameter storage unit 2122 as the initial speed of the motor (Step S204). In a case where the initial speed of the motor has been acquired, the operation monitoring unit acquires the speed itself of the motor and a time point (Step S205) and calculates a threshold value of the motor speed (Step S206). Then, it is determined whether or not the motor speed exceeds the threshold value (Step S207). In a case where the motor speed exceeds the threshold value, the safety function operation determination process is ended, and the safety function operation instruction signal is output (Step S106 in FIG. 10). In a case where the motor speed does not exceed the threshold value, the process returns to Step S205 and Step S205 is executed.

Figure 12:
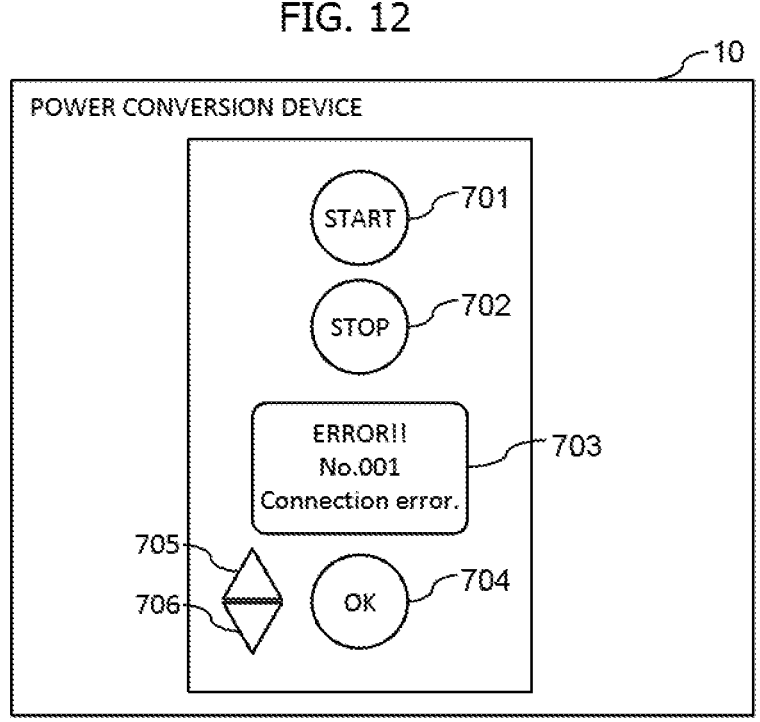
FIG. 12 is a diagram illustrating a display example of an operation unit and a display unit mounted on the power conversion device in the example.

FIG. 12 is a diagram illustrating a display example of the operation unit and the display unit mounted on the power conversion device in the example. The operation unit and the display unit are not necessarily limited to being mounted on the power conversion device, and have a configuration of being and detachable from the power conversion device by a cable or the like.

The power conversion device 10 includes an interface such as an operation start button 701, an operation stop button 702, a display portion 703, an OK button 704, an up button 705, and a down button 706.

When an error occurs, a display of a notification indicating the error is made in the display portion 703. For example, the content of "No. 001" being the number of the error and "Connection error." being the content of the error is displayed. As described above, by displaying the content of the error, the user grasps the reason, for example, why the motor 40 is stopped, and the usability is improved.

Figure 13:
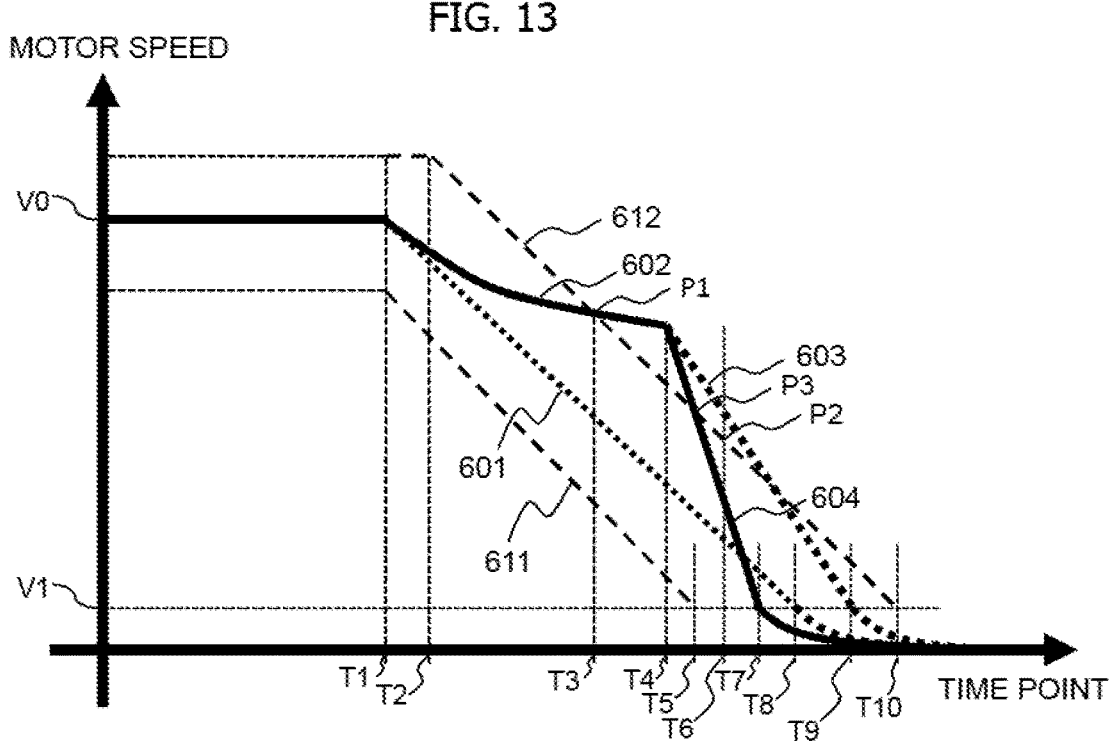
FIG. 13 is a graph describing the safety function operation in the example.

Next, an operation of decelerating the motor and then stopping the motor will be described. FIG. 13 is a graph describing the safety function operation in the example. Note that, here, a case where setting is made such that a deceleration and stop operation corresponding to Safety stop 1 (SS1) defined in the functional safety standard IEC61800-5-2 is executed will be described as an example.

In FIG. 13, a vertical axis indicates the motor speed, and a horizontal axis indicates a time point. In addition, the meaning of each reference sign is described below, and the details will be described later.

T2-T1: maximum time from when the safety request signal is received until deceleration is started T4-T3: maximum time from when the value exceeds the predetermined threshold value until a safety region returning process is started T6-T3: allowable period T8-T1: SS1 deceleration time T9-T4: deceleration time of safety region returning process T5-T1: minimum SS1 deceleration time T10-T1: maximum SS1 deceleration time T7-T4: automatically-adjusted SS1 deceleration time

601: operation in SS1 deceleration

602: operation after diagnosis error or abnormality occurs in SS1 deceleration

603: operation in accordance with the deceleration time of the safety region returning process selected by the user, after the abnormality occurs

604: operation of automatically adjusting the deceleration time of the safety region returning process (when the SS1 operation is selected)

611: minimum SS1 deceleration time (lower limit threshold value)

612: maximum SS1 deceleration time (upper limit threshold value)

P1: abnormality occurrence determination point

P2: determination point of whether or not the motor speed returns into the safety region within the allowable period P3: determination point of whether or not the motor speed is returns into a safety region in the safety region returning process (automatic adjustment)

In FIG. 13, firstly, when the emergency stop signal as the safety request signal is received at a time point T1 while the motor is operating at a speed V0, deceleration of the motor is started. Generally, at a deceleration rate, when the speed decelerates to a speed V1 as with 601 in accordance with user settings (period of a time point T8 to the time point T1: SS1 deceleration time) (time point T8), the torque is caused to turn off. Then, the motor becomes uncontrolled, and then stops.

In addition, an upper limit and a lower limit may be set for the deceleration. For example, when a range of a predetermined threshold value using a dotted line 612 as the upper limit and a dotted line 611 as the lower limit is set as a safety region, and the speed of the motor is in the safety region, the deceleration continues as it is. In a case where the speed of the motor is out of the safety region, this is considered as the excess of the predetermined threshold value. The safety function operation after the speed exceeds the predetermined threshold value will be described later.

For example, a time point T3 (point at which 602 and 612 intersect with each other: P1) when the motor speed exceeds 612 (as with 602) by some influences during deceleration and stop in SS1 (as with 601) functions as a time point at which the speed has exceeded the predetermined threshold value.

Note that, in the case of SS1, the predetermined threshold value refers to upper and lower limit threshold values and refers to threshold values defined by a minimum SS1 deceleration time and a maximum SS1 deceleration time which are set by the functional safety setting tool 70 in advance. In FIG. 13, the predetermined threshold value refers to (611, 612).

Here, the minimum SS1 deceleration time is defined as T5-T1, and the maximum SS1 deceleration time is defined as T10-T1. Note that, although a setting start point of the deceleration time is set as T1, the setting start point may be defined as a point after T2 has elapsed. T2 is the maximum time from when the emergency stop signal (here, SS1 signal) is received until deceleration is started.

In addition, in a case where not SS1 but safety limited speed (SLS) is set as the safety function operation executed when the emergency stop signal is received, the predetermined threshold value refers to the upper limit threshold value and refers to a threshold value defined by a frequency limit value set by the functional safety setting tool 70 in advance. In addition, in the case of safe direction (SDI), a speed being 0 is set as the threshold value. In a case where the normal rotation is permitted, the reverse rotation direction means exceeding of the predetermined threshold value. In a case where the reverse rotation is permitted, the normal rotation direction means exceeding of the predetermined threshold value.

When the speed exceeds the predetermined threshold value, any function of a function STO of cutting off the torque applied to the motor, a function SS1 of executing STO after the motor is decelerated and then stopped, and a function being safe brake control (SBC) of outputting a safety output signal for an external brake control is selected and set in advance by the user, and the motor stops in accordance with the selected function.

As described above, when the speed exceeds the predetermined threshold value, any safety function operation of STO, SS1, SBC, and the like, which has been selected in advance, is executed in accordance with the corresponding function specifications, and thereby it is possible to more finely control the deceleration of the motor, and thus the safety is improved.

In order to realize the above safety functions, a parameter indicating the type of safety function to be executed when the safety request signal is input is stored in the operation parameter storage unit 2122 of the safety function execution unit 212. Safety function execution unit 212 performs a control, for example, in which a variable on the program is prepared, and, for example, SS1 is executed when the value of the variable is 1, and SLS is executed when the value of the variable is 2. Further, an operation parameter related to each safety function is stored in the operation parameter storage unit 2122.

Note that the selection of the safety function operation set by the user, and parameter setting of safety-related function, such as the deceleration time and the allowable period, are performed, for example, in the functional safety setting tool 70. In a parameter setting method in the functional safety setting tool 70, for example, the functional safety setting tool 70 is connected to the communication unit 110 to write the parameter in the operation parameter storage unit 2122 of the safety function execution unit 212. A writing route is not limited to the communication unit 110, and any route may be provided so long as the parameter is finally written in the operation parameter storage unit 2122. The user who uses the functional safety setting tool 70 sets the parameter of the safety-related function in advance.

The parameter of the safety-related function is stored in the operation parameter storage unit 2122. Note that the parameter is similarly stored in the operation parameter storage unit of the safety function execution unit 222.

Figure 14:
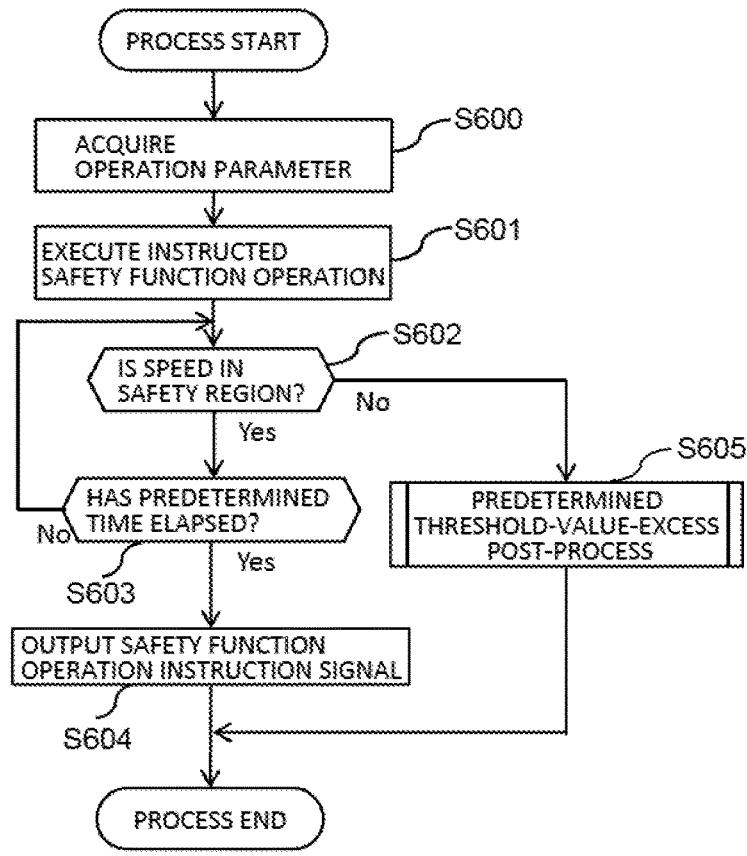
FIG. 14 is a flowchart describing a process flow of the safety function operation in the example.

Here, the detailed flow of the safety function operation process will be described with reference to FIG. 14. Note that the safety function operation instructed in FIG. 14 is, for example, SS1, SLS, SDI, or the like being the safety function operation described in IEC61800-5-2. Such a safety function operation to be executed when the emergency stop signal is received or when the speed exceeds a predetermined threshold value may be also set in the functional safety setting tool 70.

In FIG. 14, in the safety function operation process, the operation parameter set in advance is acquired (Step S600). For example, in a case where SS1 is set as the instructed safety function operation, in advance, when the instructed safety function operation is executed, deceleration is started in accordance with the SS1 deceleration time being the operation parameter set in advance (Step S601). Then, it is determined whether or not the motor speed is within the safety region (Step S602). In a case where the motor speed is out of the safety region, the process transitions to a predetermined threshold-value-excess post-process (Step S605). The predetermined threshold-value-excess post-process will be described later.

In a case where the motor speed is within the safety region, it is determined whether a predetermined time set in advance (here, SS1 deceleration time) has elapsed (Step S603). In a case where the predetermined time does not have elapsed, the process returns to Step S602, and a process of monitoring whether or not the motor speed is within the safety region is executed. In a case where predetermined time has elapsed (Step S603), the safety function operation instruction signal (here, SS1 signal) is output (Step S604).

Figure 15:
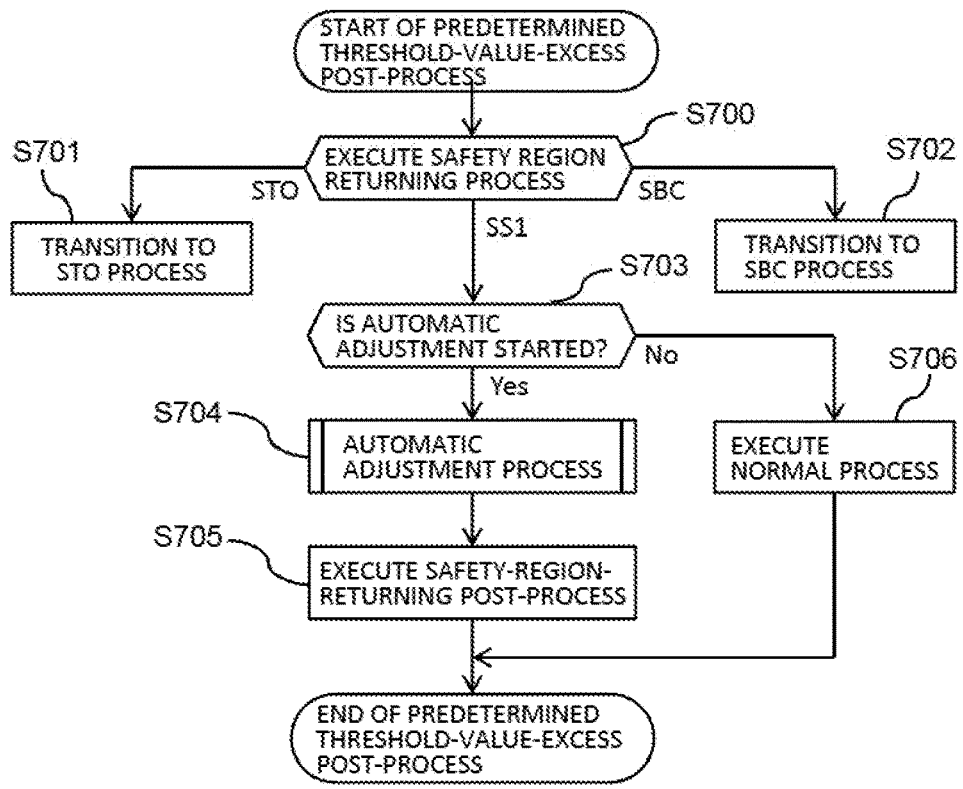
FIG. 15 is a flowchart describing a predetermined threshold-value-excess post-process in the safety function operation in the example.

FIG. 15 is a flowchart illustrating the predetermined threshold-value-excess post-process related to the safety function operation to be executed in a case where it is determined, in Step S602, that the motor speed is out of the safety region. The safety region returning process in FIG. 15 refers to STO, SS1, SBC, or the like being the safety function operation to be executed after the motor speed exceeds the predetermined threshold value (Step S605).

In FIG. 15, in a case where it is determined that the motor speed is out of the safety region, the safety region returning process is executed. In the safety region returning process, any of STO, SS1, and SBC is set in advance by the functional safety setting tool 70, and the set safety function operation is executed (Step S700).

In a case where STO is set in the safety region returning process (Step S701), the STO signal is output.

In the safety region returning process, in a case where SBC is set (Step S702), the safety output signal (SBC signal) is output for the external brake control.

Note that, in a case where SBC is set in the safety region returning process, the SBC signal may be output after another safety function operation is executed instead of immediately outputting the SBC signal, that is, for example, SBC is executed after STO is executed, STO is executed after SBC is executed, STO after SS1 is executed, and then STO is executed, and STO is executed after SS1 is executed, and then SBC is executed.

In a case where SS1 is set in the safety region returning process, it is determined which case of the case of selecting automatic adjustment in advance and the case of operating in accordance with the SS1 deceleration time of the safety region returning process, which is set in advance, as normal (Step S703).

In a case where the process transitions to a normal process (Step S706), deceleration as with 603 in FIG. 13 is performed in accordance with the SS1 deceleration time of the safety region returning process, which is set in advance. When the motor speed decelerates to the speed of V1, STO is executed to emergently stop the motor.

Note that, here, the deceleration time of the safety function operation SS1 of 603 is the SS1 deceleration time (T9-T4) of the safety region returning process, which is set by the functional safety setting tool 70 in advance. As the deceleration rate, deceleration at a rate at which the motor speed decelerates from the motor speed at a time point T4 to the motor speed (V1) at a time point T9 is performed. In addition, the deceleration time and the deceleration rate may be calculated using another criterion, for example, from the time point T1.

Note that, in a case where setting of the SS1 deceleration time of the safety region returning process is not received even though the normal process is selected, an automatic adjustment process (Step S704) may be performed.

Figure 16:
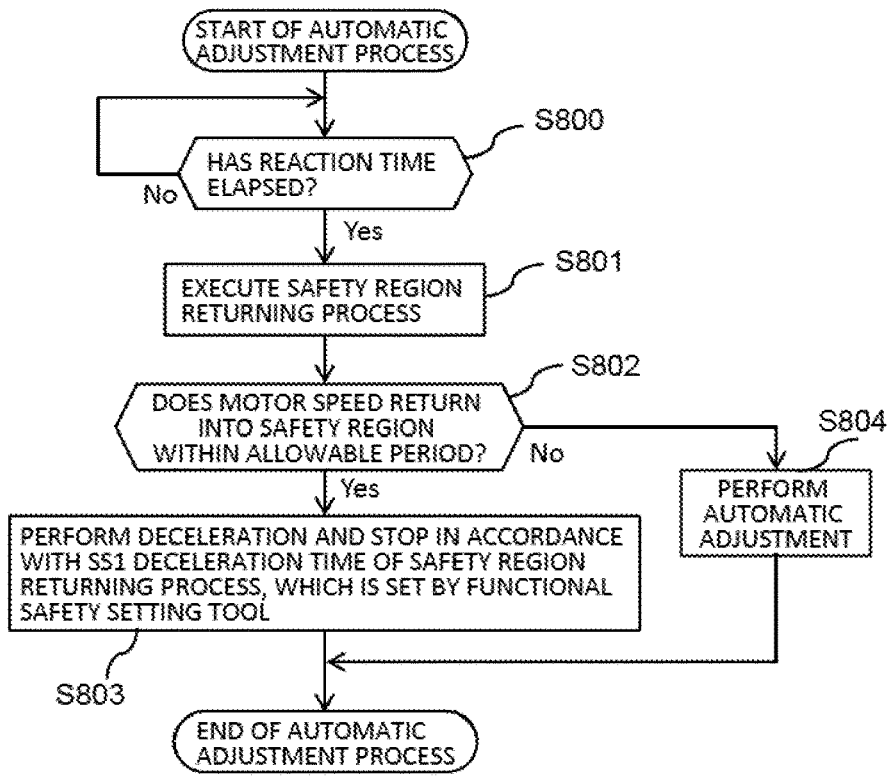
FIG. 16 is a flowchart describing an automatic adjustment process in the safety function operation in the example.

FIG. 16 is a flowchart illustrating the automatic adjustment process (Step S704) executed in a case where automatic adjustment is started. In FIG. 16, after the automatic adjustment process is started, it is determined whether a reaction time (Step S800) has elapsed. In a case where the reaction time does not have elapsed, a safety function operation in the pre-process continues until the reaction time has elapsed. In a case where the reaction time has elapsed, the safety region returning process is executed (Step S801). In FIG. 16, SS1 is set in the safety region returning process in order to describe the automatic adjustment process.

Regarding the automatic adjustment process in FIG. 16, a process flow of automatic adjustment will be described with reference to FIG. 13. A time (T4-T3) from the time point T3 at which it is determined that the motor speed exceeds the predetermined threshold value to T4 at which the safety region returning process is executed is the reaction time until the safety region returning process is executed. In a case where the reaction time does not have elapsed, the process returns to Step S800. After the reaction time has elapsed, the safety region returning process is executed (Step S801).

In FIG. 13, a time (T6-T3) from the time point T3 at which it is determined that the motor speed exceeds the predetermined threshold value to T6 is defined as the allowable period. Note that the allowable period is set by the functional safety setting tool 70 in advance. It is determined whether the motor speed returns into the safety region within the set allowable period (Step S802).

In a case where it is determined that the motor speed returns into the safety region within the allowable period, the motor is decelerated in accordance with the SS1 deceleration time of the safety region returning process, which is set by the functional safety setting tool 70, and then stopped (Step S803).

In a case where it is determined that the motor speed does not return into the safety region within the allowable period, the automatic adjustment is performed (Step S804).

In a method of determining whether the motor speed returns into the safety region within the allowable period, whether the motor speed lowers an intersection P2 and then returns into the safety region at the time point T6 is determined from the motor speed, the allowable period, and the upper limit threshold value at the time point T4 time point, in a case where deceleration and stop are performed as in the SS1 deceleration time of the safety region returning process, which is set in advance, in which the intersection P2 (point at which T6 and 612 intersect with each other) between the preset allowable period and the upper limit threshold value for determining the safety region is set in advance, at a safety region returning process execution time point being T4.

Here, since the motor speed exceeds the safety region, the upper limit threshold value is used as the condition of the determination method. In a case where the motor speed lowers the safety region, the lower limit threshold value is used as the condition of the determination method.

Note that, since the case of SS1 is used as an example here, the upper limit threshold value and the lower limit threshold value are used for determining the safety region. Thus, the upper limit threshold value and the lower limit threshold value are used for determining whether the motor speed is out of the safety region. That is, the threshold value for defining the safety region is used as a determination condition for determining whether the motor speed returns into the safety region, at the time point T4.

Note that, in a case where SLS is selected in the instructed safety function operation, regarding the safety region, the frequency limit set by the functional safety setting tool 70 in advance is the upper limit threshold value. A range of being equal to or smaller than the set frequency functions as the safety region. After the motor speed is out of the safety region, the process transitions to the predetermined threshold-value-excess post-process (step S605), and the safety function operation is executed such that the motor speed returns into the safety region, similar to SS1.

Note that, in a case where SDI is selected in the instructed safety function operation, since SDI is a rotation direction limit function, a range in the normal rotation direction in a case where the reverse rotation direction is prohibited is the safety region. In a case where the normal rotation direction is prohibited, a range in the reverse rotation direction functions as the safety region.

Note that the automatic adjustment referred here means the followings. In a dynamic situation of the time point T4 without adopting the SS1 deceleration time of the safety region returning process, which is set in advance at the time point T4, the SS1 deceleration time of the safety region returning process is changed from the motor speed, the allowable period, and the upper limit threshold value such that the motor speed returns into the safety region, for example, without adopting a preset value as the SS1 deceleration time of the safety region returning process, in which the motor speed lowers the intersection P2 at the time point T6.

In addition, the SS1 deceleration time of the safety region returning process, which is automatically adjusted, may be stored in the operation parameter storage unit (2122), and, separately, may be used as a reference value when a person who performs setting determines the SS1 deceleration time in a safety operation 2.

Note that the SS1 deceleration time of the safety region returning process may be reviewed and executed for each predetermined time, and may be finely controlled in a more dynamic situation.

If the deceleration and stop are performed at the time point T4 by adopting the SS1 deceleration time of the safety region returning process, which is set in advance, the SS1 deceleration time of the safety region returning process, which is set in advance, may correspond to the deceleration and stop assumed by the person who performs the setting. However, in a case where the deceleration time is erroneously set, for example, in a case where the SS1 deceleration time of the safety region returning process is long, the immediately-returning of the motor speed into the safety region does not occur, and the motor operates at a motor speed that exceeds the predetermined threshold value. For example, in FIG. 13, the deceleration and stop are performed at the deceleration rate of 603, and the motor speed exceeds the safety region at the intersection P2.

Since the automatic adjustment function is adopted, in the dynamic situation, for example, the time point T4 at which the safety region returning process is executed after the motor speed exceeds the predetermined threshold value, it is possible to cause the motor speed to return into the safety region within the allowable period, and to control the deceleration time of the motor in accordance with the operation condition. Accordingly, it is possible to more improve the safety of the system. For example, in FIG. 13, the deceleration and stop are performed at the deceleration rate of 604, and thus the motor speed returns into the safety region at the intersection P2. Note that the SS1 deceleration time in the automatic adjustment is defined as (T7-T4) in the example. The SS1 deceleration time may be calculated with another criterion.

In a case where the motor speed does not return into the safety region within the allowable period after the automatic adjustment is performed in step S804, setting may be performed in advance, for example, the torque applied to the motor is cut off in STO.

Next, the safety-region-returning post-process (step S705) after the automatic adjustment process in step S704 is ended, and then the motor speed returns into the safety region, in FIG. 15, will be described. In the safety-region-returning post-process, after the end of the automatic adjustment process, the safety function operation from a time point (intersection P3 between 604 and 612) at which the motor speed returns into the safety region to the stop of the motor is enabled to be selected. The safety-region-returning post-process is executed when the motor speed returns into the safety region in a case where the safety function operation from the intersection P3 to the stop is set by the functional safety setting tool 70 in advance, and the automatic adjustment process is executed.

FIG. 17 is a graph for describing the safety-region-returning post-process. In FIG. 17, for example, four options as follows are given when setting for processes after the intersection P3 at which the motor speed returns into the safety region and thus intersects with the upper limit threshold value 612 is performed by the functional safety setting tool 70. Safety region returning process option (1): the deceleration and stop are performed at the deceleration rate in 604 with maintaining the SS1 deceleration time of the safety region returning process, which is changed and adopted at the time point T4 by the automatic adjustment process. Safety region returning process option (2): the deceleration and stop are performed at the deceleration rate of 601 in accordance with the SS1 deceleration time of the instructed safety function operation. Safety region returning process option (3): the deceleration and stop are performed at the deceleration rate of 603 according to the SS1 deceleration time of the safety region returning process, which is set in advance. Safety region returning process option (4): control within the threshold value (when the safety region returning process is set to SS1, the deceleration and stop are performed at the deceleration rate of 601 according to the SS1 deceleration time in which the deceleration is performed with the median value between the upper and lower limit threshold values. The deceleration time of the safety region returning process until the motor speed lowers the median value between the upper and lower limit threshold values is similar to that in Safety region returning process option 1).

Note that the safety-region-returning post-process may be a process other than the above options. For example, in a case where SLS is set as the instructed safety function operation, when the motor speed returns into the safety region within the allowable period by the automatic adjustment, a selection of continuing the operation at the motor speed which does not exceed a limit value, without deceleration and stop, may be provided.

As described above, the safety region returning process is added, and thereby it is possible to improve the safety of the system by the safety function operation after the motor speed exceeds the predetermined threshold value.

Note that, in a case where the motor speed is out of the safety region again even in the process of executing the safety region returning process, the motor speed returns into the safety region by executing the predetermined threshold-value-excess post-process (Step S605).

In addition, a message indicating a notification that the safety function operation is executed in performing the automatic adjustment (Step S804) is displayed on the display unit 111. For example, the change (automatic adjustment) of the SS1 deceleration time of the safety region returning process when the automatic adjustment is performed (Step S804) is used as a trigger, and thus an automatic adjustment execution signal is transmitted to the operation management unit 101 through the communication unit 210 and the communication unit 110, and the operation management unit 101 that has received the automatic adjustment execution signal notifies the display unit 111 that the automatic adjustment is being performed. That is, for example, a message indicating "the safety region returning process (SS1) is executed by automatic adjustment" is displayed. Regarding a timing for the display, the display may be performed when the automatic adjustment is performed even once, and, for example, a message indicating the motor is stopped using an automatic adjustment value may be displayed instead of the SS1 deceleration time set by the setting tool after the stop.

As described above, in the example, after the abnormality in the system operation or the diagnosis error occurs, it is possible to more finely control the deceleration and the like of the motor in accordance with the condition of the system by the safety function operation selected in advance, in addition to performing cut-off by the STO operation, and thus the safety is improved.

In addition, for example, in the dynamic situation after the abnormality in the system operation or the diagnosis error occurs, in a case where SS1 is set as the safety function operation, the setting value of the deceleration time is automatically changed, and the speed is controlled to return into the safety region within the allowable period, and thus it is possible to improve the safety of the system.

REFERENCE SIGNS LIST

10 Power conversion device
20 Safety function unit
30 Input and output unit
40 Motor
50 Load machine
70 Functional safety setting tool
101 Operation management unit
102 Main body control unit
103 Drive unit
104 Current detector
107 Path self-diagnosis unit
108, 109 Optional connection portion
110, 210 Communication unit
111 Display unit
208, 209 Main-body connection portion
211, 221 Control unit
212, 222 Safety function execution unit
213, 223 MCU self-diagnosis unit
214, 224 Safety function operation instruction unit

The invention claimed is:

1. A power conversion system comprising:
a power conversion device main body configured to drive a motor; and
a safety function unit configured to execute a safety function, wherein
a connection state between the power conversion device main body and the safety function unit is determined,
the safety function unit outputs a safety function operation instruction signal based on the connection state when receiving a safety request signal,
the power conversion device main body controls the motor by the safety function operation instruction signal,
the safety function unit monitors a state of the motor, and, in a case where the state of the motor exceeds a predetermined range, executes a threshold-value-excess post-process by a safety function operation selected in advance, and
the safety function operation selected in advance is any one of safe torque off (STO), safety stop 1 (SS1), and safe brake control (SBC).

2. The power conversion system according to claim 1, wherein
the safety function unit monitors a speed of the motor, and, in a case where the speed of the motor exceeds a predetermined value, executes the threshold-value-excess post-process.

3. The power conversion system according to claim 2, wherein
the safety function unit automatically adjusts a deceleration rate of the motor such that the speed of the motor returns to the predetermined value within an allowable period from a time point when the speed of the motor exceeds the predetermined value.

4. The power conversion system according to claim 3, wherein
the threshold-value-excess post-process is the SS1, and
the safety function unit automatically adjusts the deceleration rate of the motor based on a user selection of an operation of decelerating with maintaining the deceleration rate of the motor adopted in the automatic adjustment and then stopping the motor, an operation of decelerating at the deceleration rate used in the threshold-value-excess post-process and then stopping the motor, an operation of decelerating at the deceleration rate set in advance in the automatic adjustment and then stopping the motor, or an operation of decelerating at the deceleration rate in a range between the predetermined value and a lower limit threshold value, assuming that the predetermined value is an upper limit threshold value, and then stopping the motor, after the speed of the motor returns to the predetermined value by the automatic adjustment.

5. A power conversion method of a power conversion system including a power conversion device main body configured to drive a motor and a safety function unit configured to execute a safety function, the method comprising:
determining a connection state between the power conversion device main body and the safety function unit;
outputting, based on the connection state, a safety function operation instruction signal in response to reception of a safety request signal;
controlling the motor by the safety function operation instruction signal; and in a case where a state of the motor exceeds a predetermined range, executing a threshold-value-excess post-process by a safety function operation selected in advance, wherein the safety function operation selected in advance is any one of safe torque off (STO), safety stop 1 (SS1), and safe brake control (SBC).

6. The power conversion method according to claim 5, wherein by the safety function unit, a speed of the motor is monitored, and in a case where the speed of the motor exceeds a predetermined value, the threshold-value-excess post-process is executed.

7. The power conversion method according to claim 6, further comprising:

automatically adjusting a deceleration rate of the motor such that the speed of the motor returns to the predetermined value within an allowable period from a time point when the speed of the motor exceeds the predetermined value.

8. The power conversion method according to claim 7, wherein the threshold-value-excess post-process is the SS1, and the safety function unit automatically adjusts the deceleration rate of the motor based on a user selection of an operation of decelerating with maintaining the deceleration rate of the motor adopted in the automatic adjustment and then stopping the motor, an operation of decelerating at the deceleration rate used in the threshold-value-excess post-process and then stopping the motor, an operation of decelerating at the deceleration rate set in advance in the automatic adjustment and then stopping the motor, or an operation of decelerating at the deceleration rate in a range between the predetermined value and a lower limit threshold value, assuming that the predetermined value is an upper limit threshold value, and then stopping the motor, after the speed of the motor returns to the predetermined value by the automatic adjustment.

* * * * *